United States Patent

[11] 3,575,446

| [72] | Inventors | Don W. Brantley<br>Lafayette, La. (P.O. Box 26564, New Orleans, La. 70126);<br>Uvon Skipper, 11607 Hillcroft St., Houston, Tex. 77035 |
|---|---|---|
| [21] | Appl. No. | 803,327 |
| [22] | Filed | Feb. 28, 1969 |
| [45] | Patented | Apr. 20, 1971 |

[54] QUICK-CONNECT COUPLER
4 Claims, 11 Drawing Figs.

[52] U.S. Cl. .................................................. 285/85,
151/8, 285/317, 285/402
[51] Int. Cl. .............................................. F16l 15/00
[50] Field of Search .......................................... 285/82, 87,
85, 88, 308, 309, 310, 313, 317, 360, 361, 376,
401, 402; 287/125; 292/302; 151/6, 8; 70/252

[56] References Cited
UNITED STATES PATENTS

| 594,214 | 11/1897 | Radel ........................... | 151/6 |
| 915,985 | 3/1909 | Medovarski .................. | 285/376X |
| 1,033,187 | 7/1912 | Metzger ........................ | 285/87 |
| 1,490,771 | 4/1924 | Fortin et al. .................. | 285/376X |
| 1,838,313 | 12/1931 | Kohr ............................. | 285/304 |
| 2,087,982 | 7/1937 | Mabee .......................... | 70/252 |

FOREIGN PATENTS
856,714  12/1960  Great Britain ................ 285/88

*Primary Examiner*—Dave W. Arola
*Attorney*—Berman, Davidson and Berman

ABSTRACT: A quick-connect coupler including axially interfitting male and female cylindrical members with the male member having a J-shaped slot formed in its outer face. The long leg of the slot extends longitudinally of the male member and the short leg thereof extends generally perpendicularly to the long leg at the end thereof opposite the free end of the male member.

The female member is provided with a lug on its inner face which engages in the J-shaped slot and upon rotation of the female member with respect to the male member secures the members together. A spring-pressed key is provided in the lug to engage in an offset portion of the short leg of the slot. In one form of the invention the key is permanently held in the offset portion permanently locking the members together. In another form the key and offset portion are shaped so that reverse torque applied to the members will cause the key to retract from locking position. In still another form the key is provided with an externally actuated cam for retracting the key.

Patented April 20, 1971

INVENTORS.
DON W. BRANTLEY,
UVON SKIPPER,
BY Berman, Davidson & Berman
ATTORNEYS.

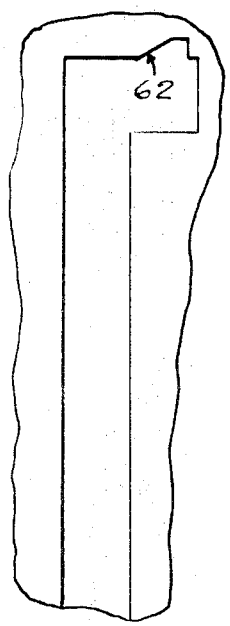
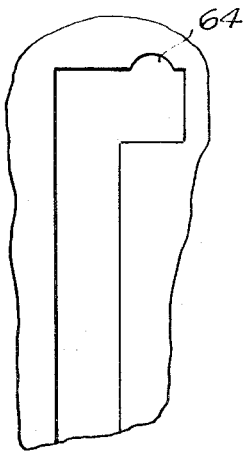
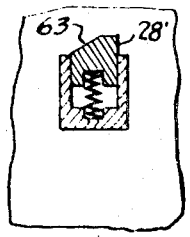
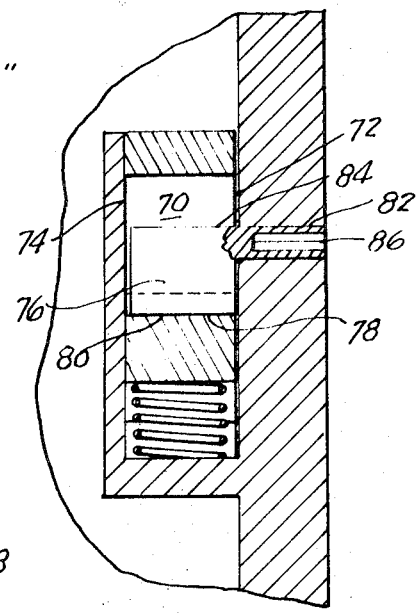
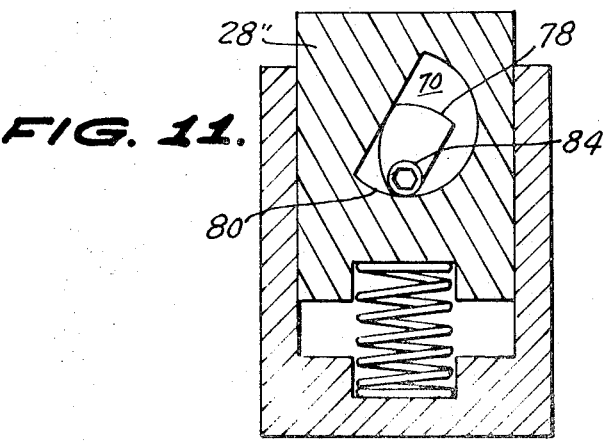
INVENTORS.
DON W. BRANTLEY,
BY  UVON SKIPPER,
ATTORNEYS.

QUICK-CONNECT COUPLER

This invention relates to new and useful improvements in coupling devices and in particular to conduit couplers having variable disengageable characteristics.

In general, quick-connect coupling devices have extensive use in industrial, commercial, and residential applications. By the use of these devices, it is possible to rapidly join independent pipes, rods, etc., without appreciable skill or effort to form long assemblies of these units. These devices are especially useful when such assemblies are to be frequently connected and disconnected. These couplers eliminate wear and tear on threaded joints, replacement of gaskets on flanged joints and save considerable time in these ensuing operations. However, couplers previously available, while generally performing the same function, tend to be complex in design and thereby result in a costly product. Furthermore, due to the complexity of design and the multiplicity of parts required, malfunction of these devices is more apt to occur.

It is, therefore, a primary object of the instant invention to provide quick-connect couplers which are designed to overcome the above-mentioned difficulties. These couplers are simple in design, requiring few parts for successful performance, effective in countless coupling and uncoupling actions without breakdown, and economical in construction and manufacture.

Another object of this invention is to provide a coupler capable of joining conduits without requiring specialized tools or techniques.

Another object of this invention is to provide a coupler having members which slidably interengage and positively lock to form a permanent connection.

Another object of the instant invention is to provide couplers with a positive locking feature, as mentioned above, which are further provided with means for externally unlocking.

Another object of this invention is to provide couplers which are uncoupled by the subsequent application of a reverse torque, wherein the resistance to uncoupling varies with the shape of the key and offset portion.

Other objects and advantages of this invention will be made readily apparent from the disclosure and attached specification, and from the accompanying drawings, wherein:

FIG. 6 shows a modified J-shaped keyway having an offset portion at the upper end and designed for releasable engagement of the coupler members;

FIG. 7 shows locking means for use with the keyway of FIG. 6;

FIG. 8 shows a modified J-shaped keyway having an offset portion with a convex section, also designed for releasable engagement of the coupler members;

FIG. 9 is an enlarged elevational view, partly in section, showing permanent of locking means depressed by the action of an internal cam-extended shaft arrangement;

FIG. 10 is a side elevational view, partly in section, of the locking means of FIG. 9, taken substantially on line 10-10, showing the external shaft connections with the internal cam; and FIG. 11 shows the locking means of FIG. 9 in a released condition.

Referring to the drawings in detail wherein similar reference numerals are applied to corresponding parts throughout the several views.

Figure 1:
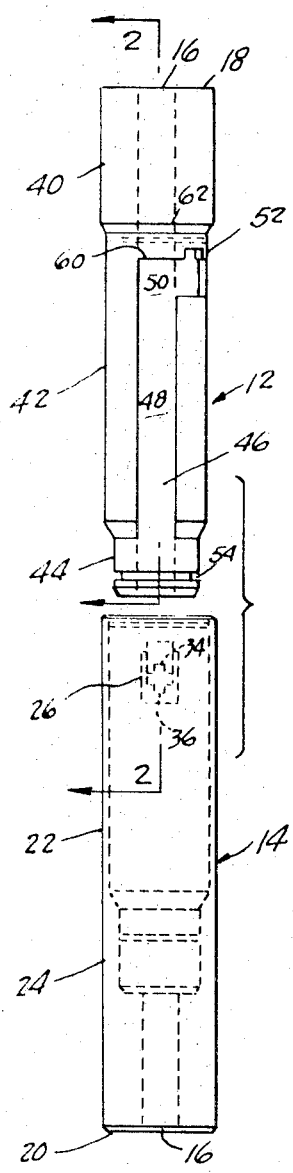
FIG. 1 is an elevational view of an embodiment of the instant invention showing the coupler members prior to engagement.
Figure 2:
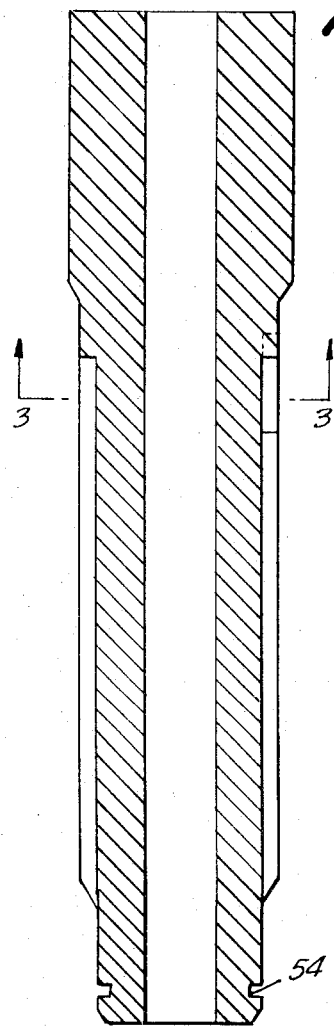
FIG. 2 is an enlarged sectional view of FIG. 1, taken substantially along the longitudinal axis on lines 2-2.

In FIG. 1, one embodiment of a coupling device or coupler constructed in accordance with the instant invention is designated as 10. As shown in its uncoupled condition, the coupler 10 includes a male member 12 and a female member 14 shown immediately prior to engagement. Engagement is easily accomplished by pushing down on male member 12, thereby interengaging female member 14 and then applying a clockwise torque to couple said male member with said female member. Each of the members 12, 14 have a generally cylindrical shape with an internal bore 16 which is longitudinally disposed to communicate with each other thereby permitting passage of material through coupler 10. Obviously, the opposite ends of each member, as shown at 18 and 20, are suitably connected to a conduit (not shown) to form a continuous path for the passage of the materials therethrough.

Figure 4:
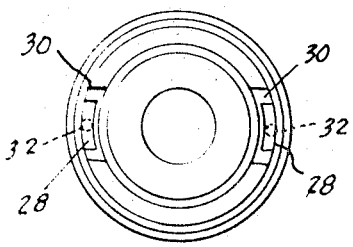
FIG. 4 is a plan view looking down the bore of female member of FIG. 2, taken substantially along the line 4-4.

The female member 14 has an elongated cylindrical shape with upper portion 22 and lower portion 24 distinguished by its differing internal diameters, each portion having a relatively smooth internal surface which is adapted to slidably receive male member 12 in axial alignment. The upper portion 22 may be further characterized as incorporating a pair of locking means 26 near the upper end thereof, secured diametrically on the internal surface at the same elevation as shown in FIG. 4. Each of the locking means 26 includes a movable key 28, a housing 30 constraining said key from all motion except vertical motion, and a vertically disposed coil spring 32 confined between the housing 30 and the bottom of key 28. Recesses 34, 36 provided in key and housing respectively, prevent slippage and lateral movement of spring 32. Recesses 34, 36 provide adequate room for the spring, in a compressed state, permitting full withdrawal of the key into the housing, as may be seen in FIG. 9.

The male member 12 is generally formed with three cylindrical sections axially aligned to constitute an elongated member having an upper section 40, an intermediate section 42, and a lower section 44. The upper section 40 has an outer diameter approximately equal to the outer diameter of female member 14. Pipes (not shown) attached at ends 18, 20 having a diameter equal to coupler 10 form a continuous smooth assembly, free of surface projections or obstructions. This is especially desirable when the assembly is to be painted, or when it is lowered into a well casing.

Figure 3:
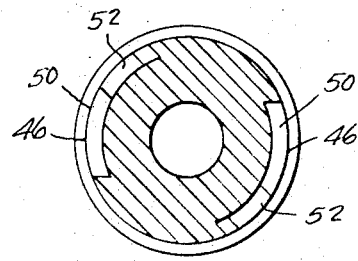
FIG. 3 is a transverse sectional view of the male member of FIG. 2, taken substantially along the axis on lines 3-3.

Intermediate section 42, longer than upper section 40 but smaller in outer diameter, is provided with a pair of generally J-shaped keyways 46 adapted to slidably receive, guide and activate locking means 26 of female member 14. Each keyway 46 is located on the external surface of section 12 and positioned diametrically opposite to each other, as in FIG. 3, to accommodate each of the locking means 26. Keyway 46 includes a narrow, recessed, leg portion 48 which extends longitudinally for substantially the length of intermediate section 42. At an upper end, leg portion 48 communicates with a transverse leg portion 50. Transverse portion 50 is also recessed in said surface and extends partially around the circumference of said surface to complete J-shaped keyway 46. A recessed offset portion 52 extending upwardly from leg portion 50 and communicating therewith is further provided to secure key 28 when members 12, 14 are in coupled relation. The respective shapes of offset portion 52 and key 28 determine whether the coupler is connected permanently, as in FIG. 5, or whether the coupler is disengageable by application of a reversely applied torque as in FIGS. 6—8. These variations will be subsequently described in greater detail.

Figure 5:
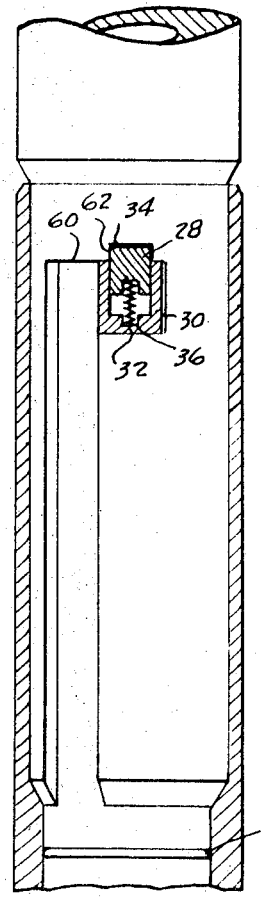
FIG. 5 is an elevational view, partly in section, showing the male and female members in a coupled arrangement.

The lower section 44 of male member 12 is shorter than intermediate section 42, having a diameter somewhat smaller than the radial distance between housings 30 of locking means 26. In this manner section 44 can position and guide entry of locking means 26 into the recess 48 of keyway 46. An annular groove 54 is provided at the lower end of section 44 for housing a sealing ring 56 which is preferably of a resilient material such as rubber, neoprene, etc. As shown in FIG. 5, sealing ring 56 uniformly contacts the internal surface of lower portion 24 of member 14 to effectively seal gaseous or liquid materials contained therein.

In performing the coupling operation, one or both of the separable members may be manipulated by the operator to position locking means 26 into keyway 46. By sliding these members toward each other, key 28 contacts upper edge 60 of keyway 46 and is fully depressed into housing 30 thereby compressing spring 32. A clockwise rotation of female member 14 transversely slides locking means 26 into transverse leg portion 50. At the point of vertical alignment between key 28 and offset portion 52, spring 32 is released, thereby imparting a vertical motion to key 28. Upon entry of key 28 into offset portion 52 members 12, 14 are thereby coupled.

As is seen in the accompanying drawings, various modifications of coupler 10 are contemplated by this invention. Coupler 10 may be made to be permanently connecting, as shown in FIGS. 1 through 5, by providing matched key and offset portions having an abutting edge or resistance angle 62 of approximately 90°, as shown in FIG. 5. By this arrangement, once key 28 is secured within offset portion 52 a positive locking is achieved, which will not unlock or uncouple despite application of rotational forces applied in either clockwise or counterclockwise direction. This embodiment is necessary in applications demanding absolute protection against inadvertent uncoupling or tampering.

On the other hand, coupler 10 may be provided with modifications which render the coupled members disengageable. At a resistance angle of 90° the torque required for disengagement is practically infinite, and the members are permanently coupled, as shown in FIGS. 1 to 5. Similarly, the torque required for disengagement may therefore be decreased by reducing this resistance angle. Under these conditions, the members are separable. Where the resistance angle of offset portion is 0, i.e., no offset portion at all, torque required to separate the members is minimal By changing the resistance angle from 0° to 90° the torque required to separate the members may be thereby altered.

In FIGS. 6, 7 a resistance angle 62 approximately 45° is provided. The key 28' has a matching edge 68 inclined to abut. It should be appreciated, however, that the resistance angle need not be constant. As shown in the embodiment of FIG. 8, a concavely shaped offset portion 64 is provided to accommodate a key (not shown) having a projecting convex portion adapted to fit portion 64 when engaged. Other abutting angles and shapes of the offset portion and engaging key may be substituted with the objective of modifying the quantity of torque required for disengagement. Where the "resistance angle" is curved, the extent of penetration of the key is the determinative factor for disengagement. It should also be noted that the feature of disengagement in an opposite direction to engagement is especially valuable in those applications where there is a continuous rotation applied to the coupler as, for example, in drilling operations. For this purpose, the coupler may be of solid stock except for the interengaging portions of the separable members. Rods welded to the ends of coupler 10 may therefore be formed of exceedingly long links capable of disengagement after completion of the drilling operation.

Whereas members 12, 14 of coupler 10, shown in FIGS. 1—5, form a permanent connection, these coupled members may be rendered separable when the modification shown in FIGS. 9—11 are incorporated therein. With this modification, the desirable features of a positive locking coupler is combined with the features of a disengageable coupler. This is accomplished by providing key 28'' with an inclined semicircular aperture 70 extending from outer surface 72 to inner surface 74 adapted to accommodate cam 76, pivotally positioned within aperture 70. Cam 76 has a curved lower surface 78 slidably adapted to fit the curved bottom 80 of aperture 76 and thereon exert a downward force against spring 32. A rotatable shaft 82 secured in the outer wall of the male member 12 and extending therethrough connects with apex portion 84 of cam 76 thereby permitting the cam to rotate about the shaft 82. When surface 78 of cam 76 disengages from lower surface 80, spring 32 is released and activates vertical movement of key 28''. Shaft 82 is provided with a hexagonal aperture 86 at the outer edge adapted to receive an allen wrench or its equivalent. As may be seen in FIG. 9, counterclockwise rotation of shaft 82 creates an upward key movement for locking while clockwise rotation of shaft 82 forces the key down and out of the offset portion, thereby disengaging the members 12, 14.

From the foregoing description, it should be readily apparent that the quick-connect coupler embodiments of the instant invention are extremely versatile, adaptable to numerous uses and applications and possess such inherent desirable features as being quickly connectable, quickly disengageable (where desired), permanently connectable (where desired), and permanently connectable with disengaging means. Furthermore, the coupler is simple in construction, and as may be readily appreciated, is relatively tamperproof due to (1) the absence of external protrusions and (2) the internal positioning of the working mechanism. The smooth external surface of the cylindrically shaped members constitutes a coupler which is easy to handle, will not snag, scratch, or puncture an operator handling it. Furthermore, the coupler is lightweight due to an efficient design obviating the need for a multiplicity of components.

While preferred embodiments of the instant invention have been described in the foregoing description, it should be understood that this invention is not limited in its scope with the embodiments described, and variations in the form of the invention are contemplated thereby.

We claim:

1. A quick-connect coupler comprising generally cylindrical axially interfitting male and female members, said male member having a J-shaped slot formed in its outer face with said slot having a long leg extending from the free end of said male member longitudinally thereof and a short leg connecting with inner end of said long leg and extending generally perpendicularly thereto, said short leg of said slot having a longitudinal offset portion formed therein, said female member including a lug on its inner face extending radially inwardly thereon, said lug engaging in the long leg of said slot as said members are engaged axially and in the short leg of said slot as said members are rotated relative to each other about their axis, a key mounted in said lug for sliding movement longitudinally of said members, and a spring in said lug normally urging said key outwardly of said lug for engagement of said key with said offset portion of said short leg to lock said lug in said short leg and maintain said members in coupled relation.

2. A device as claimed in claim 1 wherein said key is generally rectangular and said offset portion is generally rectangular to permanently lock said lug in said slot to permanently lock said members together.

3. A device as claimed in claim 1 wherein said key and said offset portion are so constructed and arranged so that on reverse rotation of said members said key is forced from said offset portion to release said key from said offset portion.

4. A device as claimed in claim 1 wherein said key has an aperture formed therein, a cam mounted for rotation in said aperture to engage one wall of said aperture to retract said key upon rotation of said cam in one direction and release said key for spring urging outwardly on opposite rotation of said cam and means extending through said female member for rotating said cam by hand.